United States Patent
Webb et al.

(10) Patent No.: US 8,408,376 B2
(45) Date of Patent: Apr. 2, 2013

(54) DRIVE UNCOUPLER (75) Inventors: Raymond C. Webb, Clemmons, NC (US); John Gunn, Charlotte, NC (US)

(73) Assignee: Clark Equipment Company, Statesville, NC (US)

(*) Notice: Subject to any disclaimer, the term of this patent is extended or adjusted under 35 U.S.C. 154(b) by 823 days.

(21) Appl. No.: 12/501,863

(22) Filed: Jul. 13, 2009

(65) Prior Publication Data

US 2011/0005889 A1    Jan. 13, 2011

(51) Int. Cl.
  *F16D 43/08*    (2006.01)
  *F16D 43/284*   (2006.01)
(52) U.S. Cl. ............ 192/105 C; 192/105 CP; 192/103 F
(58) Field of Classification Search .............. 192/103 A, 192/105 F, 105 C, 105 CP
  See application file for complete search history.

(56) References Cited

U.S. PATENT DOCUMENTS

| | | | |
|---|---|---|---|
| 829,128 A * | 8/1906 | Sturtevant ................. | 192/105 C |
| 846,193 A * | 3/1907 | Fellows ..................... | 192/105 C |
| 979,595 A * | 12/1910 | Stuhldreier ............. | 192/105 CS |
| 1,132,746 A | 3/1915 | Sundh | |
| 1,438,614 A * | 12/1922 | Settlage ................... | 192/105 CP |
| 1,509,966 A | 9/1924 | McFarland | |
| 1,638,239 A * | 8/1927 | Bryson ........................... | 477/14 |
| 1,696,898 A * | 1/1929 | Aiken ............................ | 381/346 |
| 1,784,793 A | 12/1930 | Prior ............................. | 74/336 R |
| 1,793,735 A * | 2/1931 | De La Mater ............. | 192/105 C |
| 1,806,332 A * | 5/1931 | Chryst ..................... | 192/105 CP |
| 1,832,526 A * | 11/1931 | Brown ..................... | 192/105 CP |
| 2,195,354 A * | 3/1940 | Bateman .................... | 192/105 C |
| 2,419,890 A * | 4/1947 | Freeborn ................... | 192/105 R |
| 2,859,847 A * | 11/1958 | Kuehn ..................... | 192/105 CP |
| 2,954,674 A | 10/1960 | Kane | |
| 3,684,071 A | 8/1972 | Wheymann | |
| 3,693,771 A * | 9/1972 | De Lancey ............. | 192/105 CD |
| 3,817,358 A | 6/1974 | Hess | |
| 3,862,676 A | 1/1975 | Schall | |
| 3,880,250 A | 4/1975 | Emanuele | |
| 4,111,291 A * | 9/1978 | Horstman ................. | 192/105 C |
| 4,308,940 A | 1/1982 | Cadee | |
| 4,353,448 A * | 10/1982 | Sommer .................... | 192/70.13 |
| 4,431,099 A * | 2/1984 | Jackson ................... | 192/105 C |
| 4,529,078 A * | 7/1985 | Keck ......................... | 192/107 C |
| 4,583,626 A | 4/1986 | Spridco | |
| 4,687,085 A * | 8/1987 | Shimizu et al. .......... | 192/104 C |
| 4,830,164 A * | 5/1989 | Hays ......................... | 192/70.13 |
| 4,860,865 A * | 8/1989 | Montalvo et al. .............. | 192/70 |
| 4,871,299 A | 10/1989 | Hrabal | |

(Continued)

FOREIGN PATENT DOCUMENTS

FR    1096552 A    6/1955

*Primary Examiner* — Justin Holmes
*Assistant Examiner* — Jacob S Scott
(74) *Attorney, Agent, or Firm* — Michael Best & Friedrich LLP (57) ABSTRACT

A coupling device including a drive member that is rotatable about an axis, a driven member that is substantially aligned with the drive member and is selectively rotatable about the axis, a speed sensing member that is coupled to the drive member and is movable between a first position and a second position in response to the rotational speed of the drive member, and a clutch member that is movable between a disengaged position and an engaged position in response to movement of the speed sensing member between the first position and the second position. At least a portion of the clutch member is removable without changing the alignment between the drive member and the driven member.

18 Claims, 4 Drawing Sheets

U.S. PATENT DOCUMENTS

| | | | |
|---|---|---|---|
| 5,341,907 A * | 8/1994 | Yokocho et al. | 192/75 |
| 5,601,171 A * | 2/1997 | Flotow | 192/70.13 |
| 5,664,656 A | 9/1997 | Dissett | |
| 5,691,587 A | 11/1997 | Lamb | |
| 5,697,763 A | 12/1997 | Kitchener | |
| 6,536,574 B2 * | 3/2003 | Fehring | 192/105 C |
| 6,793,057 B1 * | 9/2004 | Smith, Jr. | 192/70.14 |
| 7,530,438 B2 * | 5/2009 | Gochenour | 192/105 CP |
| 2007/0181398 A1 | 8/2007 | Bassett et al. | |

* cited by examiner

DRIVE UNCOUPLER

BACKGROUND

The present invention relates to drive couplings for selectively coupling two rotating bodies. More particularly, the invention relates to drive couplings that automatically engage two rotating bodies in response to the rotational speed of one of the bodies.

Drive couplings are employed between a driving component and a driven component to relay power from the driving component to the driven component.

Typical rotating machines such as air compressors, pumps, and the like are typically powered by a prime mover such as an internal combustion engine, a diesel engine, a turbine engine, and the like. To connect the prime mover to the driven component, flexible couplings are often employed. These flexible couplings allow for some misalignment and absorb some vibrations between the two rotating components. However, the use of flexible couplings has drawbacks. For example, the driven component must be unloaded to start the prime mover, or the starting system must be robust enough to rotate the entire system, thus requiring heavier duty and more expensive starter components. Thus, excess fuel is consumed because the unloaded driven component cannot be uncoupled while the driving component is running. Furthermore, failures that occur to typical flexible drive couplings require that the driving component and driven component be disassembled to facilitate the replacement of the coupling. These failures commonly occur at worksites which may not have facilities to do extensive repairs. The disassembly procedure may require that systems not affected by the coupling failure be taken apart, opening the possibility of contamination or breakage of system components.

SUMMARY

The coupling device of the invention in one form as an automatic drive uncoupler, uncouples the driving and driven components at idle, thereby reducing unnecessary fuel consumption. A clutch member has radially replaceable friction pads that can be easily serviced through an opening in a housing. Repairs can be made in the field using simple hand tools with virtually no disassembly of the driving component and driven component, thereby providing a reduction in repair costs through ease of maintenance.

In one construction, the invention provides a coupling device that includes a drive member that is rotatable about an axis and a driven member that is substantially aligned with the drive member and is selectively rotatable about the axis. A speed sensing member is coupled to the drive member and is movable between a first position and a second position in response to the rotational speed of the drive member. A clutch member is movable between a disengaged position and an engaged position in response to movement of the speed sensing member between the first position and the second position. At least a portion of the clutch member is removable without changing the alignment between the drive member and the driven member.

In another construction, the invention provides a coupling device that includes a drive member that is rotatable about an axis at a variable rotational speed and a driven member that is substantially aligned with the drive member and is selectively rotatable about the axis. A first flyweight and a second flyweight are each coupled to the drive member and are each movable between a first position and a second position in response to the rotational speed of the drive member. A synchronizer is coupled to the first flyweight and the second flyweight such that each moves toward the second position at substantially the same rotational speed. A first clutch member and a second clutch member are each movable between a disengaged position and an engaged position in response to movement of the corresponding first flyweight and second flyweight between the first position and the second position.

In another construction, the invention provides a coupling device that includes a drive member that is rotatable about an axis at a variable rotational speed and a driven member that is substantially aligned with the drive member and is selectively rotatable about the axis. A speed sensing member is coupled to the drive member and is movable between a first position and a second position in response to the rotational speed of the drive member. A clutch member includes a housing with an aperture through a radially outward surface and a friction pad that is removable through the aperture without changing the alignment between the drive member and the driven member. The friction pad is movable between a disengaged position and an engaged position in response to movement of the speed sensing member between the first position and the second position. The friction pad moves to the engaged position to engage the driven member such that the drive member and the driven member rotate substantially in unison.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
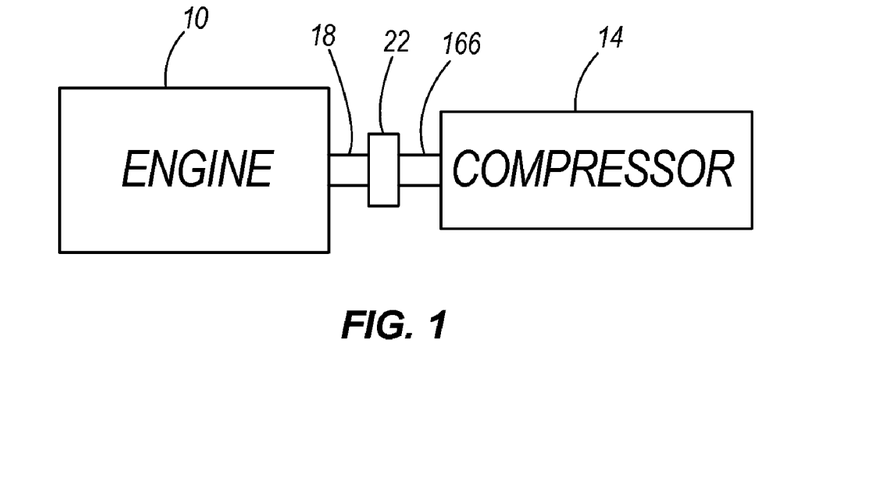
FIG. 1 is a schematic view of an engine coupled to a compressor with a coupling device.

FIG. 1 shows a driving component in the form of an engine 10 positioned to provide rotational power to a driven component in the form of a compressor 14. The illustrated engine 10 is an internal combustion engine such as a diesel engine and includes an engine output shaft 18. Of course, other driving components could include other engines such as gasoline powered internal combustion engines, rotary engines, and the like. In addition, other driving components such as motors or combustion turbines could be employed. In still other constructions, the driving component may be any body or component which is operable to transmit power, for example, a drive shaft or another power train component.

The engine 10 powers the compressor 14. The compressor 14 may be used to compress a refrigerant, air, or any other fluid, as desired. In other constructions, the driven component may be a pump, a generator, or any other rotating component that is periodically started and stopped, as desired.

Figure 2:
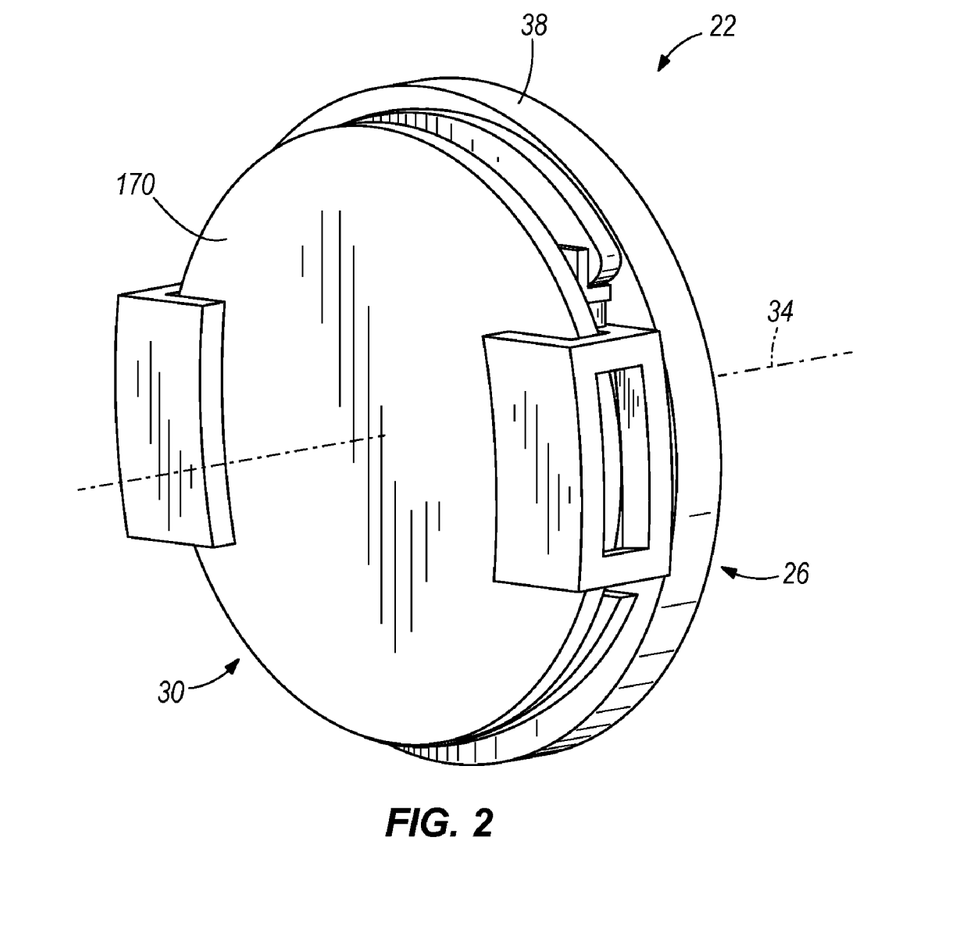
FIG. 2 is a perspective view of a coupling device according to the invention and suitable for use in the arrangement of FIG. 1.

FIG. 2 shows a coupling device in the form of an automatic drive uncoupler 22 that is positioned between the engine 10 and the compressor 14. The automatic drive uncoupler 22 includes a drive member 26 that is connected to the engine 10 and a driven member 30 that is connected to the compressor 14. In the illustrated construction, the drive member 26 is directly connected to the engine 10 via the engine output shaft 18. In another construction, a gear box or another transmission device is positioned between the driving component and the driven component to increase or decrease the rotational speed of the driven component relative to the driving component.

The drive member 26 rotates about a drive axis 34 that runs parallel to the engine output shaft 18 and through the center of the drive member 26. The drive member 26 also includes a flywheel 38 that is generally disk shaped. In the preferred construction, the flywheel 38 provides rotational inertia to the system to reduce accelerations in the rotational speed of the shaft. The illustrated flywheel 38 is coupled directly to the engine output shaft 18. In other constructions, the flywheel 38 could be a different shape (e.g., an ellipse), have a different configuration (e.g., not directly coupled to the engine output shaft 18), and/or provide more or less inertia to the system.

Figure 3:
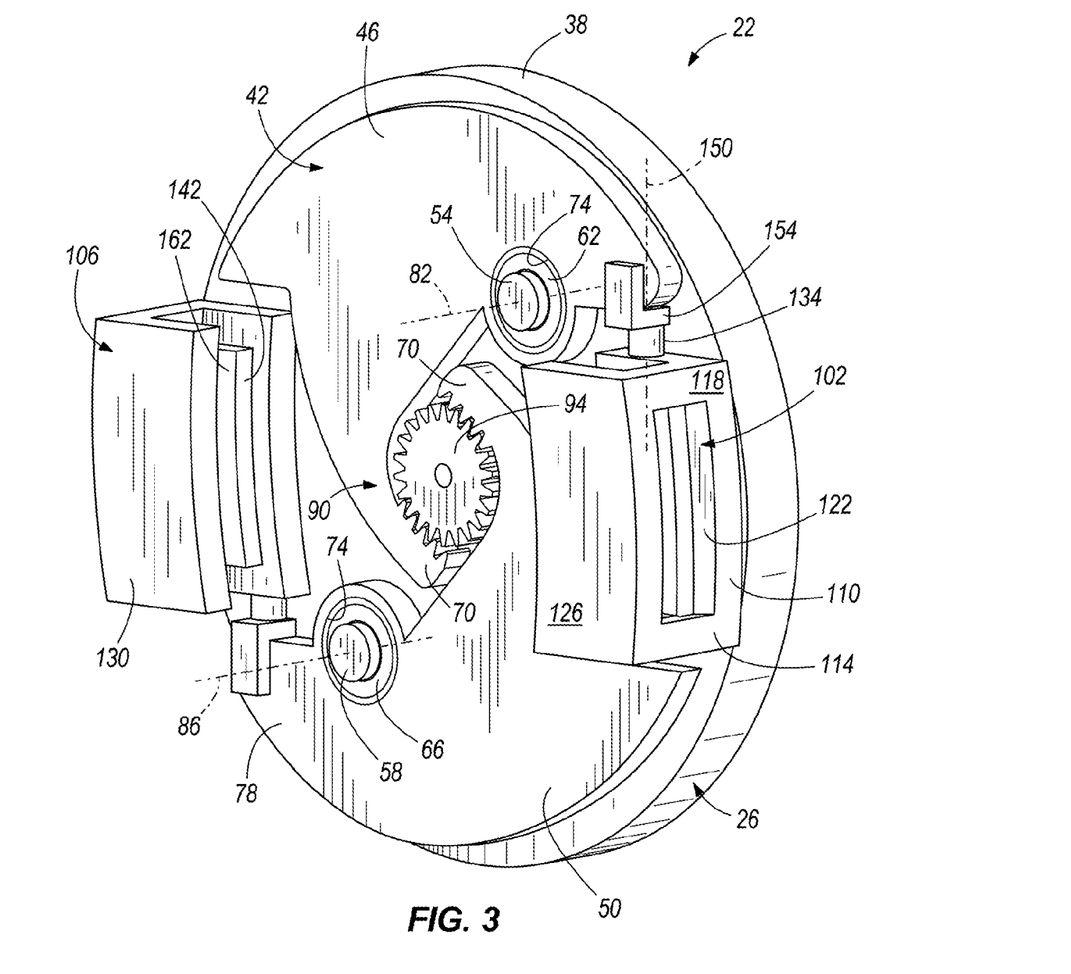
FIG. 3 is a perspective view of the coupling device of FIG. 2 with a driven member removed and in a disengaged position.

As best shown in FIG. 3, the drive member 26 includes a speed sensing member 42 that includes a first flyweight 46, a second flyweight 50, a first anchor pin 54, a second anchor pin 58, a first bearing 62, and a second bearing 66. The second flyweight 50, the second anchor pin 58, and the second bearing 66 are similar to the first flyweight 46, the first anchor pin 54, and the first bearing 62, respectively and will not be discussed in detail.

The first anchor pin 54 is mounted to the flywheel 38 to define a first pivot axis 82 running parallel to the drive axis 34 and spaced therefrom. The second anchor pin 58 is mounted to the flywheel 38 about a second pivot axis 86 running parallel to the drive axis 34 and spaced therefrom. In the illustrated construction, the first anchor pin 54 and the second anchor pin 58 are fastened directly to the flywheel 38. In preferred constructions, the first anchor pin 54 and the second anchor pin 58 include a threaded portion such that the first anchor pin 54 and the second anchor pin 58 removably fastened to the flywheel 38 (e.g., threaded). However, other constructions may permanently affix the first anchor pin 54 and the second anchor pin 58 to the flywheel 38 (e.g., adhesive, welding, brazing, etc.) or may form the first anchor pin 54 and the second anchor pin 58 as part of the flywheel 38. In other constructions, the first anchor pin 54 and the second anchor pin 58 may be attached to (either removably or permanently), or formed as part of the first flyweight 46 and the second flyweight 50, respectively.

The first bearing 62 includes an inner race, rolling members, and an outer race that are arranged to allow reduced friction rotation of the outer race with respect to the inner race. In the illustrated construction, the inner race is sized to closely match the diameter of the first anchor pin 54 and the outer race is sized to closely fit within an aperture 74 formed in the first flyweight 46. The rolling members may include balls, rollers, needles and the like. The first bearing 62 couples the first flyweight 46 to the first anchor pin 54 such that the first flyweight 46 may rotate about the first anchor pin 54 and the first pivot axis 82. The second bearing 66 couples the second flyweight 50 to the second anchor pin 58 such that the second flyweight 50 may rotate about the second anchor pin 58 and the second pivot axis 86. In the illustrated construction, a sealed ball bearing is employed. Of course other constructions could employ unsealed bearings, needle bearings, roller bearings, journal bearings, and the like.

Figure 4:
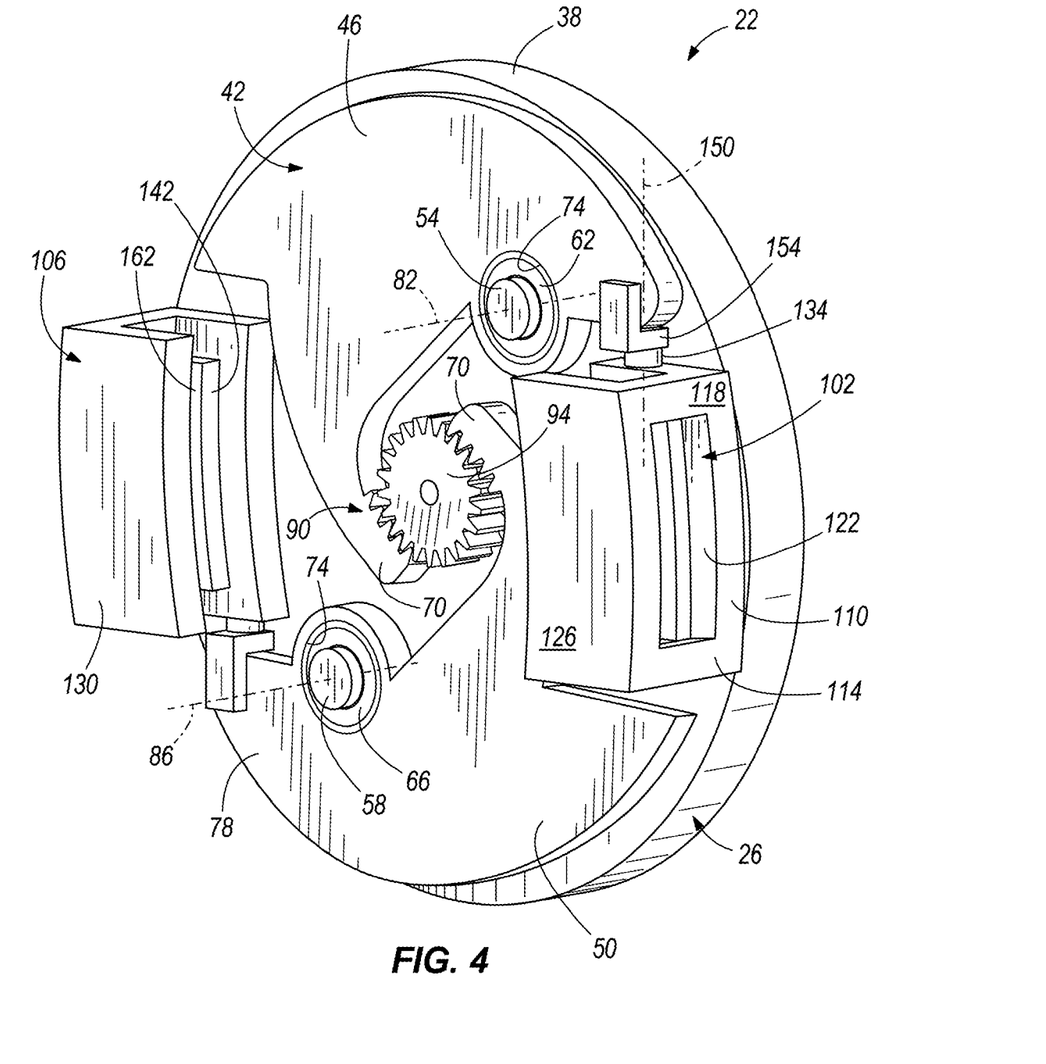
FIG. 4 is a perspective view of the coupling device of FIG. 2 with the driven member removed and in an engaged position.

The first flyweight 46 and second flyweight 50 each include a synchronizing portion 70 and an actuating portion 78 and are movably attached to the first anchor pin 54 and second anchor pin 58 respectively, via the first bearing 62 and second bearing 66 respectively. The first flyweight 46 and second flyweight 50 are movable between a first or disengaged position (illustrated in FIG. 3) and a second or engaged position (illustrated in FIG. 4). With reference to FIG. 3, the synchronizing portion 70 includes a curved portion that includes a plurality of gear teeth. The actuating portion 78 extends from the aperture 74 such that movement of the flyweight 46 between the disengaged position and the engaged position produce a corresponding movement at the actuating portion 78.

Figure 5:
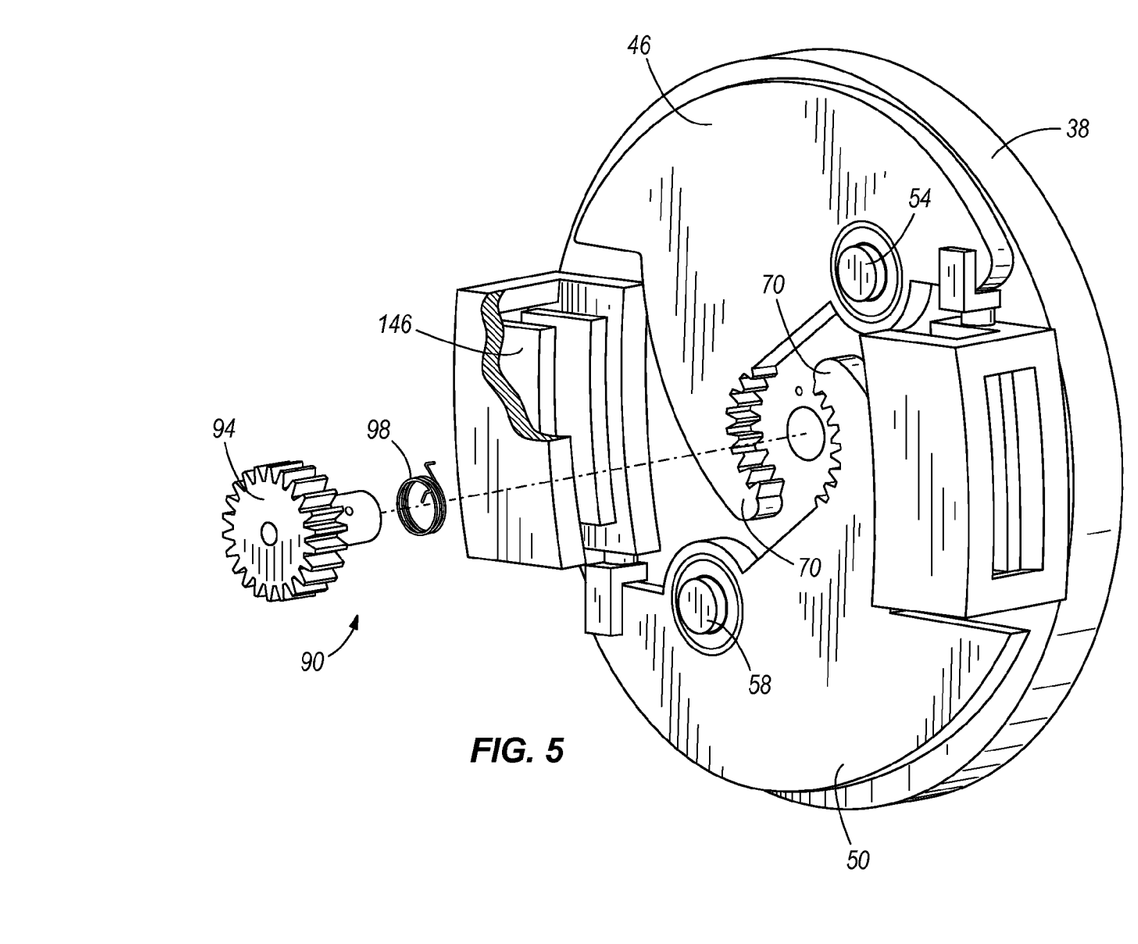
FIG. 5 is a partially exploded view of the coupling device of FIG. 2 the driven member removed and a portion of a brake housing broken away.

A synchronizing member 90 couples the first flyweight 46 to the second flyweight 50 such that the first flyweight 46 and the second flyweight 50 move between the first position and the second position substantially in unison. As illustrated in FIG. 5, one construction of the synchronizing member 90 includes a toothed gear 94 and a torsion spring 98. The toothed gear 94 is positioned on the flywheel 38 and coupled thereto for rotation about the drive axis 34. The toothed gear 94 engages the gear teeth of the synchronizing portions 70 of the first flyweight 46 and the second flyweight 50 and maintains an engaged relationship with both the first flyweight 46 and the second flyweight 50 during movement between the first position and the second position. The torsion spring 98 is coupled to the flywheel 38 and the toothed gear 94 and acts to bias the toothed gear 94 in a counterclockwise direction (as viewed in FIG. 5) to bias the first flyweight 46 and the second flyweight 50 toward the disengaged position (FIG. 3).

A first clutch member 102 is operatively connected to the first flyweight 46 and a second clutch member 106 is operatively connected to the second flyweight 50. The first clutch member 102 is disposed within a first housing 110 that is directly connected to the flywheel 38. In the illustrated construction, the first housing 110 is fastened to the flywheel 38 with bolts. The first housing 110 includes an outer wall 114 positioned substantially adjacent the outer diameter of the flywheel 38 and extending in a direction substantially parallel with the drive axis 34. The outer wall 114 has a radially outward surface 118 and an aperture 122 formed through the radially outward surface 118. A cap portion 126 is formed with the outer wall 114 and extends toward the drive axis 34 in a direction substantially perpendicular to the drive axis 34. A second housing 130 associated with the second clutch member 106 is similar to the first housing 110 and will not be discussed in detail.

Each of the first clutch member 102 and the second clutch member 106 includes an actuating rod 134, a master cylinder (not shown), a first friction pad 142, and a second friction pad 146, all disposed substantially within the first housing 110 or second housing 130. The actuating rod 134 defines a rod axis 150 along its length, a first end 154, and a second end (not shown). The first end 154 is directly coupled to the actuating portion 78 of the respective flyweight 46 such that the actuating rod 134 can rotate relative to the flyweight 46. The second end is coupled to the master cylinder such that the actuating rod 134 may travel along the rod axis 150. The actuating rod 134 translates the rotary motion of the flyweight 46 into a substantially linear motion along the rod axis 150.

The master cylinder translates the motion of the actuating rod 134 along the rod axis 150 into a motion of the first friction pad 142 parallel to the drive axis 34. The linear motion of the actuating rod 134, and the force applied thereby, is amplified via appropriately sized hydraulic pistons such that a larger force is applied at a different location. The design and specific arrangement of the master cylinder is not limiting to the invention. In one construction the master cylinder may be different or may be eliminated. In addition, the master cylinder may be replaced with a mechanical linkage system or another actuation system, as desired.

The first friction pad 142 defines a friction surface 162 that is substantially parallel to the flywheel 38 and spaced from the cap portion 126. The first friction pad 142 is movably coupled to the master cylinder and is movable between a disengaged position and an engaged position in response to rotation of the first flyweight 46 between the first position and the second position, respectively. In the illustrated construction, the first friction pad 142 includes a ceramic material well suited to heat transfer and high friction situations. In other constructions, other materials such as chopped steel wool, wire, iron powder, copper, graphite, inorganic fillers, friction modifiers, glass, rubber, carbon, carbon fiber such as KEVLAR®, high-temperature resins, ceramic fibers, nonferrous filler materials, bonding agents, and/or other materials may be used, as desired.

The second friction pad 146 is mounted to the cap portion 126 of the first housing 110. The second friction pad 146 may be a floating friction pad (i.e., allows some movement substantially parallel to the drive axis 34) or may be fixed in place. The first friction pad 142 and the second friction pad 146 define a gap having a width. The gap is smaller when the first friction pad 142 is in the engaged position than when in the disengaged position. In other words, the first friction pad 142 and the second friction pad 146 are drawn together when the first friction pad 142 moves toward the engaged position.

The second clutch member 106 is similar to the first clutch member 102 and will not be discussed in detail. The second clutch member 106 is located on the flywheel 38, is disposed within the second housing 130, and functions substantially the same as the first clutch member 102 in response to movement of the second flyweight 50.

In the illustrated construction, the driven member 30 is directly connected to the compressor 14 via an input shaft 166. The driven member 30 selectively rotates about the drive axis 34 and includes a floating rotor 170 that is generally disk shaped. In an exemplary construction, the floating rotor 170 includes a central aperture with a female spline (not shown). The input shaft 166 includes a male spline (not shown) that engages the female spline of the floating rotor 170. The engagement of the male spline with the female spline allows the floating rotor 170 to be firmly attached to the compressor input shaft 166 to allow torque transfer while allowing the floating rotor 170 to float along the drive axis 34 of the compressor input shaft 166 to account for uneven wear of the first friction pad 142 and the second friction pad 146.

The floating rotor 170 is axially displaced from the flywheel 38 and positioned within the first clutch member 102 and the second clutch member 106 between the first friction pad 142 and the second friction pad 146. When the first friction pad 142 is in the disengaged position the floating rotor 170 is not in substantial contact with the first friction pad 142 or the second friction pad 146.

In one construction, the automatic drive uncoupler 22 is contained within a housing (not shown) or a bell housing (not shown) that includes an access cover (not shown). The bell housing inhibits access to the automatic drive uncoupler 22 and the access cover may be removed to provide access for maintenance.

In operation, when the engine 10 is not running the drive member 26 is not rotating and likewise, the driven member 30 is substantially stationary. When the engine 10 starts up, the drive member 26 begins to rotate and the engine 10 accelerates to an idle speed without any load being applied to the driven member 30. As the speed of the rotation increases above idle speed, the first flyweight 46 and the second flyweight 50 begin to rotate about the first anchor pin 54 and second anchor pin 58, respectively, from the first position toward the second position. As the first flyweight 46 and the second flyweight 50 rotate, the toothed gear 94 and torsion spring 98 synchronize the movement such that the first flyweight 46 and the second flyweight 50 rotate at the same pace and begin rotation at the same rotational speed. As one of ordinary skill will realize, the torsion spring 98 can be sized (i.e., free length and stiffness) to provide rotation at virtually any speed desired.

As the first flyweight 46 and the second flyweight 50 rotate towards the second position, the actuating rods 134 move such that the master cylinders 138 move the first friction pads 142 toward the second friction pads 146 of the first and second clutch members 102, 106 (i.e., moving from the disengaged position towards the engaged position). In the illustrated construction, no external intervention is necessary to move the first and second clutch members 102, 106 between the engaged and disengaged positions (i.e., the coupling device actuates automatically in response to the rotational speed of the driving component). As the first friction pads 142 move toward the second friction pads 146, the floating rotor 170 is engaged and begins to rotate with the drive member 26.

When the drive member 26 first begins to engage the driven component (e.g., the compressor 14), the friction surface 162 of the first friction pad 142 allows some slippage between the first friction pad 142 and the floating rotor 170 such that the driven component (e.g., the compressor 14) is gradually brought to the rotational speed of the drive component (e.g., the engine 10). Once the first flyweight 46 and the second flyweight 50 are positioned in the second position and the first friction pads 142 are in the engaged position, the floating rotor 170 and therefore the driven member 30 rotate at substantially the same rate or speed as the drive member 26 with substantially no slippage.

As the engine 10 slows to an idle speed, or at any other time the engine 10 is at or below idle speed, the first flyweight 46 and the second flyweight 50 are retracted to the first position by the torsion spring 98 and the toothed gear 94. The first friction pads 142 are moved to the disengaged position in response to the movement of the first flyweight 46 and the second flyweight 50 to the first position. Therefore, at or below idle speeds the drive member 26 is substantially decoupled from the driven member 30, such that the drive member 26 may be rotating relatively slowly under no load while the driven member 30 is substantially stationary.

While the driven member 30 is not rotating (e.g., with the engine 10 off), the first friction pad 142 may be removed through the aperture 122 in the radially outward surface 118 of the first housing 110 and/or the second housing 130 without changing the alignment between the drive member 26 and the driven member 30. A new first friction pad 142 may then be installed through the aperture 122 without changing the alignment between the engine 10 and the compressor 14. Likewise, the second friction pad 146 may be replaced through the aperture 122. The ability to replace the friction pads 142, 146 without altering the alignment of the drive and driven components (e.g., the engine 10 and the compressor 14) presents a significant advantage over any existing system. The alignment process is time consuming and costly. As such, avoiding the need to realign the driving and driven components satisfies a long standing need in the industry to provide a faster and less expensive mode for replacing couplings.

Various features and advantages of the invention are set forth in the following claims.

What is claimed is:

1. A coupling device comprising:
a drive member rotatable about an axis;
a driven member substantially aligned with the drive member and selectively rotatable about the axis;
a first flyweight and a second flyweight, each coupled to the drive member and each movable between a first position and a second position in response to the rotational speed of the drive member;
a synchronizing member positioned to couple the first flyweight and the second flyweight such that the first flyweight and the second flyweight pivot from the first position to the second position at about the same speed; and
a clutch member movable between a disengaged position and an engaged position in response to movement of the first flyweight and the second flyweight between the first position and the second position,
wherein the synchronizing member includes a gear that engages the first flyweight and the second flyweight, and
wherein the clutch member is disposed within a housing having an aperture through a radially outward surface, at least a portion of the clutch member being removable through the aperture without changing the alignment between the drive member and the driven member.

2. The coupling device of claim 1, wherein the drive member includes a flywheel supported for rotation about the axis.

3. The coupling device of claim 1, wherein the driven member includes a floating rotor that is selectively rotatable about the axis and can move axially along the axis.

4. The coupling device of claim 1, wherein the drive member and the driven member are uncoupled and rotate with respect to one another when the first and second flyweights are in the first position, and the drive member and the driven member are coupled and rotate substantially in unison when the first and second flyweights are in the second position.

5. The coupling device of claim 1, wherein the drive member and the driven member are uncoupled and rotate with respect to one another when the clutch member is in the disengaged position, and the drive member and the driven member are coupled and rotate in unison when the clutch member is in the engaged position.

6. The coupling device of claim 1, wherein the clutch member includes a friction pad and an actuator operable to move the friction pad in a direction substantially parallel to the axis.

7. The coupling device of claim 6, wherein the friction pad is radially removable from the actuator without changing the alignment between the drive member and the driven member.

8. The coupling device of claim 1, wherein the clutch member includes a first friction pad and a second friction pad.

9. The coupling device of claim 1, wherein the synchronizing member includes a biasing member that biases the gear such that the first flyweight and the second flyweight are biased toward the first position.

10. The coupling device of claim 9, wherein the biasing member is a torsional spring.

11. A coupling device comprising:
a drive member rotatable about an axis at a variable rotational speed;
a driven member substantially aligned with the drive member and selectively rotatable about the axis;
a first flyweight and a second flyweight, each coupled to the drive member and each movable between a first position and a second position in response to the rotational speed of the drive member;
a synchronizer coupled to the first flyweight and the second flyweight such that each moves toward the second position at substantially the same rotational speed; and
a first clutch member and a second clutch member, each movable between a disengaged position and an engaged position in response to movement of the corresponding first flyweight and second flyweight between the first position and the second position;
wherein each clutch member includes a friction pad and an actuator operable to move the friction pad in a direction substantially parallel to the axis.

12. The coupling device of claim 11, wherein at least a portion of each of the first clutch member and the second clutch member are removable without changing the alignment between the drive member and the driven member.

13. The coupling device of claim 11, wherein the drive member includes a flywheel that rotates about the axis.

14. The coupling device of claim 13, wherein the first flyweight is moveably coupled to the flywheel such that the first flyweight rotates about a first pivot axis separate from the axis, and the second flyweight is moveably coupled to the flywheel such that the second flyweight rotates about a second pivot axis separate from the axis.

15. The coupling device of claim 11, wherein the driven member includes a floating rotor that is selectively rotatable about the axis and can move axially along the axis.

16. A coupling device comprising:
a drive member rotatable about an axis at a variable rotational speed;
a driven member substantially aligned with the drive member and selectively rotatable about the axis;
a speed sensing member including a first flyweight and a second flyweight, each flyweight coupled to the drive member and movable between a first position and a second position in response to the rotational speed of the drive member;
a synchronizing member interconnecting the first flyweight and the second flyweight to coordinate movement of the first flyweight and the second flyweight; and
a clutch member disposed within a housing having an aperture through a radially outward surface, the clutch member including a friction pad removable through the aperture without changing the alignment between the drive member and the driven member, the friction pad movable between a disengaged position and an engaged position in response to movement of the speed sensing member between the first position and the second position;
wherein the synchronizing member includes a gear that engages the first flyweight and the second flyweight, and wherein the friction pad moves to the engaged position to engage the driven member such that the drive member and the driven member rotate substantially in unison.

17. The coupling device of claim 16, wherein the drive member includes a flywheel that rotates about the axis, the speed sensing member and the clutch member are coupled and rotatable with the flywheel; and wherein the speed sensing member is rotatably mounted to the flywheel.

18. The coupling device of claim 16, wherein the synchronizing member includes a biasing member that biases the gear such that the first flyweight and the second flyweight are biased toward the first position.

* * * * *